US008905783B2

United States Patent
Umemoto et al.

(10) Patent No.: US 8,905,783 B2
(45) Date of Patent: Dec. 9, 2014

(54) TERMINAL BOX FOR SOLAR CELL MODULE

(75) Inventors: Masayuki Umemoto, Kusatsu (JP); Keiichi Kimura, Kusatsu (JP)

(73) Assignee: Yukita Electric Wire Co., Ltd., Shiga (JP)

( * ) Notice: Subject to any disclaimer, the term of this patent is extended or adjusted under 35 U.S.C. 154(b) by 136 days.

(21) Appl. No.: 13/698,373

(22) PCT Filed: May 20, 2010

(86) PCT No.: PCT/JP2010/058532
§ 371 (c)(1),
(2), (4) Date: Dec. 19, 2012

(87) PCT Pub. No.: WO2011/145195
PCT Pub. Date: Nov. 24, 2011

(65) Prior Publication Data
US 2013/0090007 A1    Apr. 11, 2013

(51) Int. Cl.
*H01R 13/40* (2006.01)
*H01R 33/965* (2006.01)
*H01L 31/048* (2014.01)
*H01R 9/24* (2006.01)
*H01R 13/52* (2006.01)

(52) U.S. Cl.
CPC .......... *H01R 33/965* (2013.01); *H01L 31/0485* (2013.01); *H01R 9/2408* (2013.01); *H01R 13/5205* (2013.01); *Y02E 10/50* (2013.01)
USPC .......................................... 439/587; 439/274

(58) Field of Classification Search
CPC ........... H01R 13/5208; H01R 13/5213; H01R 13/5219; H01R 13/5221; H01R 13/5205; H01R 33/00

USPC ......... 439/271, 272, 274, 275, 556, 587, 588, 439/589
See application file for complete search history.

(56) References Cited

U.S. PATENT DOCUMENTS 5,634,807 A * 6/1997 Saito ............................. 439/275
5,645,451 A * 7/1997 Ohsumi et al. ................ 439/587

(Continued)

FOREIGN PATENT DOCUMENTS

JP  58-186581  12/1983
JP  62-8653    1/1987

(Continued)

OTHER PUBLICATIONS

International Search Report issued Jun. 15, 2010 in International (PCT) Application No. PCT/JP2010/058532.

(Continued)

*Primary Examiner* — Thanh Tam Le
(74) *Attorney, Agent, or Firm* — Wenderoth, Lind & Ponack, L.L.P.

(57) ABSTRACT

A box body (11) includes a plurality of terminal plates (14) arranged in the box body (11), and a cable introduction portion (13) disposed on a side surface of the box body (11) to introduce a connection cable (20). A water blocking sleeve (30) is disposed around the connection cable (20) to secure the connection cable (20) to the cable introduction portion (13). The water blocking sleeve (30) is disposed between the cable introduction portion (13) and the connection cable (20). The water blocking sleeve (30) includes an inner sleeve (31) in close contact with the connection cable (20), and an outer sleeve (32) disposed on an outer side of the inner sleeve (31) and being in close contact with the cable introduction portion (13). The inner sleeve (31) and the outer sleeve (32) are integral with one another.

4 Claims, 5 Drawing Sheets

(56) References Cited

U.S. PATENT DOCUMENTS

| | | | |
|---|---|---|---|
| 5,931,699 A * | 8/1999 | Saito | 439/587 |
| 6,250,962 B1 * | 6/2001 | Shinozaki | 439/587 |
| 6,383,022 B1 * | 5/2002 | Murakami et al. | 439/589 |
| 6,872,092 B2 * | 3/2005 | Oka | 439/587 |
| 7,156,698 B2 * | 1/2007 | Yamashita | 439/587 |
| 7,273,395 B2 * | 9/2007 | Hayashi | 439/587 |
| 7,371,115 B1 * | 5/2008 | Hsieh et al. | 439/587 |
| 7,762,842 B2 * | 7/2010 | Deubel et al. | 439/589 |

FOREIGN PATENT DOCUMENTS

| | | |
|---|---|---|
| JP | 10-50412 | 2/1998 |
| JP | 2000-133831 | 5/2000 |
| JP | 2000-353567 | 12/2000 |
| JP | 2001-77391 | 3/2001 |
| JP | 2002-171082 | 6/2002 |
| JP | 2008-60512 | 3/2008 |
| JP | 2008-140597 | 6/2008 |

OTHER PUBLICATIONS

International Preliminary Report on Patentability and Written Opinion of the International Search Authority issued Dec. 20, 2012 in International (PCT) Application No. PCT/JP2010/058532.

English Translation of JP 58-186581 having a publication date of Dec. 12, 1983.

English Translation of JP 62-8653 having a publication date of Jan. 19, 1987.

* cited by examiner

TERMINAL BOX FOR SOLAR CELL MODULE

TECHNICAL FIELD

The present invention relates to a terminal box for a solar cell module.

RELATED ART

In recent years, with increased consciousness for environmental issues, environmentally friendly power generating systems have been in focus. An example is a solar photovoltaic generation system using solar cell modules to generate power. The solar photovoltaic generation system includes a plurality of solar cell modules arranged in a matrix on the roof or other location of a building. Each of the modules supplies power through a coupling box, an inverter, a distribution board, and other elements. Each solar cell module is coupled in series or parallel to abutting solar cell modules. Each solar cell module includes a terminal box mounted on the rear surface of the solar cell module so as to retrieve power generated by the solar cell module (see, for example, patent documents 1 and 2).

The terminal box for the solar cell module has a box body in which a plurality of terminals electrically coupled to the output terminal of the solar cell module are disposed. These terminals are electrically coupled to cables at one end used for external coupling. The other end of each cable is coupled to cable or other elements of another terminal box on another solar cell module.

RELATED ART DOCUMENTS

Patent Documents

[Patent Document 1] Japanese Unexamined Patent Application Publication No. 2001-77391.
[Patent Document 2] Japanese Unexamined Patent Application Publication No. 2000-133831.

SUMMARY OF THE INVENTION

Problems to be Solved by the Invention

In the conventional terminal box for the solar cell module, the interior of the box body is potted in silicone resin so as to ensure a waterproof property. However, silicone resin is expensive, causing increases in cost. Additionally, potting using silicone resin is performed with the terminal box mounted on the solar cell module. This makes the silicone resin difficult to handle, and easily causes problems including entrance of air bubbles and non-uniform potting. Thus, it is difficult to ensure a stable waterproof property. Furthermore, it takes a substantial period of time for the potted silicone resin to cure, resulting in the problem of poor work efficiency.

Also in the conventional terminal box for the solar cell module, a welded member separate from the box body is used to hold the cable for external coupling between the welded member, followed by ultrasonic welding or other processing to couple the box body and the welded member to one another. Thus, the cable for external coupling is secured to the box body. However, when the cable for external coupling has a resin covering, the covering can be melted by the heat of the ultrasonic welding. This can cause a gap to occur between the box body and the cable for external coupling. This, as a result, can undermine the waterproof property of the terminal box for the solar cell module.

Additionally, the connection cable is usually pulled out of the box body through a cylindrical wiring hole disposed on a side wall of the box body. The wiring hole is just about the size that permits the connection cable to pass through the wiring hole. However, the terminal box mounted on the solar cell module turns into high temperature state when in use. Possible changes in temperature can cause the connection cable to contract and a gap to occur between the connection cable and the wiring hole. This can undermine the waterproof property of the terminal box, making the terminal box unsuitable for long-term applications.

The present invention has been made in view of the above-described circumstances, and it is an object of the present invention to provide a terminal box for a solar cell module that ensures a sufficient waterproof property while ensuring a simple structure and low-cost production.

Means of Solving the Problems

In order to accomplish the above-described object, a terminal box for a solar cell module according to the present invention is disposed on the solar cell module to electrically couple the solar cell module to a plurality of solar cell modules. The terminal box includes a box body sealed by a lid. The box body includes, inside the box body, a plurality of terminal plates coupled to an output terminal of the solar cell module. The box body includes, on a side surface of the box body, a cable introduction portion through which a connection cable for external coupling is introduced into the box body and wired therein to be coupled to the terminal plates. A water blocking sleeve is disposed around the connection cable to secure the connection cable to the cable introduction portion. The water blocking sleeve is disposed between the cable introduction portion and the connection cable to prevent entrance of water.

This ensures cutoff performance between the cable introduction portion and the connection cable, and provides waterproof means at the portion where the connection cable is introduced into the box body.

In the terminal box for a solar cell module of the above-described configuration, the water blocking sleeve preferably includes an inner sleeve in close contact with the connection cable, and an outer sleeve disposed on an outer side of the inner sleeve and being in close contact with the cable introduction portion. The outer sleeve is integral with the inner sleeve. An interface between the connection cable and the water blocking sleeve, and an interface between the cable introduction portion and the water blocking sleeve are preferably sealed.

In the terminal box for a solar cell module of the above-described configuration, the water blocking sleeve is preferably made of a rubber material.

More specifically, the water blocking sleeve preferably includes a plurality of elastic depressions and protrusions at the interface between the connection cable and the water blocking sleeve and at the interface between the cable introduction portion and the water blocking sleeve. The depressions and protrusions are elastically in close contact with the connection cable and the cable introduction portion.

The cable introduction portion of the box body preferably includes an approximately cylindrical wiring hole through which the connection cable passes, and an outer circumference groove disposed on an outer circumference of the wiring hole and being open to an outer side surface of the box body.

The inner sleeve of the water blocking sleeve is disposed through the wiring hole, while the outer sleeve of the water blocking sleeve is fitted in the outer circumference groove.

The inner sleeve of the water blocking sleeve preferably has an inner diameter of equal to or less than an outer diameter of the connection cable and is in close contact with an outer circumference surface of the connection cable. The outer sleeve of the water blocking sleeve preferably has an inner diameter or outer diameter of equal to or less than a diameter of the cable introduction portion and is in close contact with the cable introduction portion.

With the above-described configurations, even though the terminal box turns into high temperature state when in use, the interface between the connection cable and the water blocking sleeve and the interface between the cable introduction portion and the water blocking sleeve are kept in close contact state. This prevents occurrence of a gap between the connection cable and the cable introduction portion in the box body, ensuring long-term reliability in cutoff performance.

Effects of the Invention

With the terminal box for a solar cell module of the above-described configuration according to the present invention, a water blocking sleeve is disposed around the connection cable to prevent entrance of water between the box body (cable introduction portion) and the connection cable, thereby ensuring a waterproof property. This ensures cutoff performance at the portion (at the cable introduction portion) where the connection cable is introduced. Additionally, the water blocking sleeve includes an inner sleeve and an outer sleeve, and thus exhibits reliable waterproof performance with respect to the connection cable and to the cable introduction portion for a long period of time. Thus, a terminal box for a solar cell module is provided that ensures a sufficient waterproof property while ensuring a simple structure and low-cost production.

DETAILED DESCRIPTION OF THE INVENTION

An embodiment of the terminal box for a solar cell module according to the present invention will be described below by referring to the accompanying drawings. It will be appreciated that the following embodiment is provided for exemplary purposes only and is not intended as limiting the technical scope of the present invention.

Figure 1:
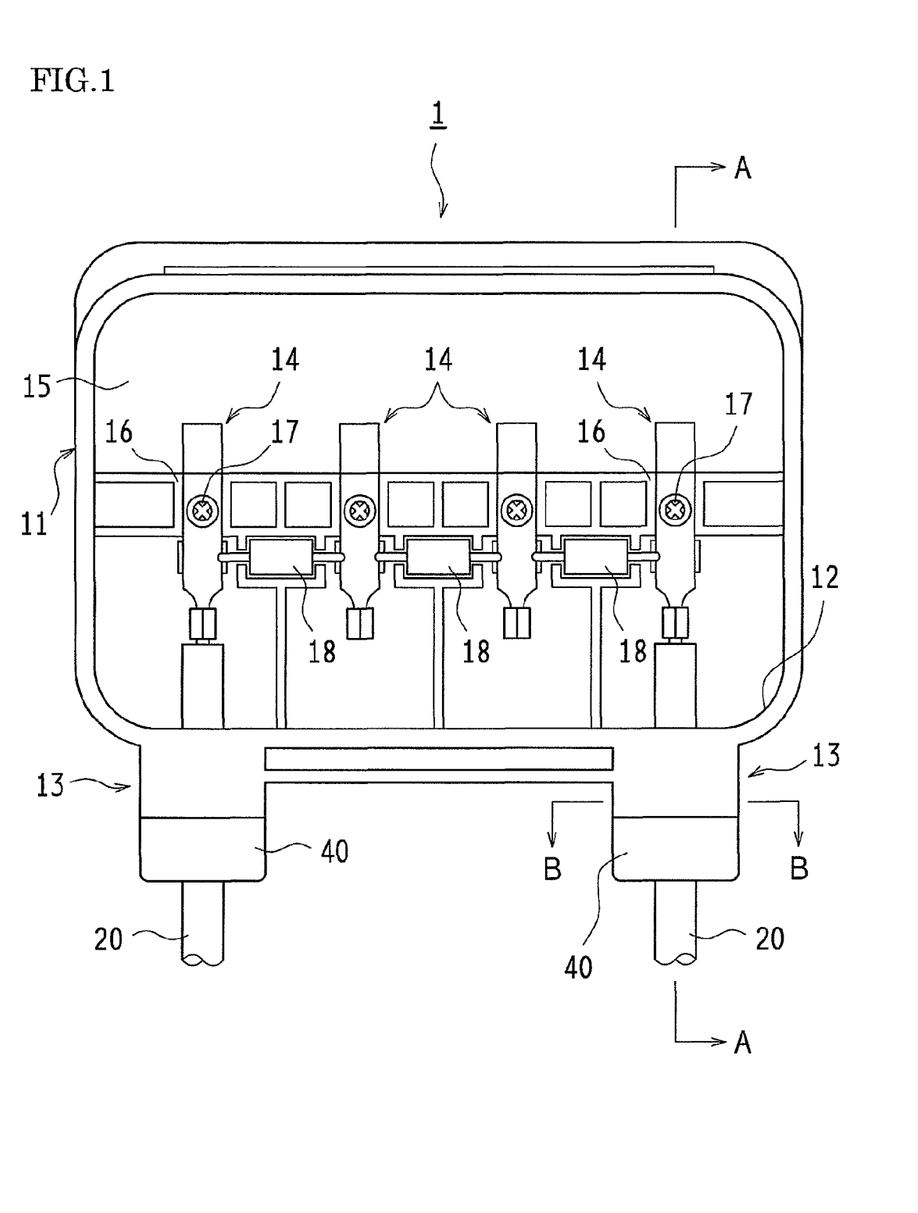
FIG. 1 is a plan view of a box body of a terminal box for a solar cell module according to one embodiment of the present invention.
Figure 2:
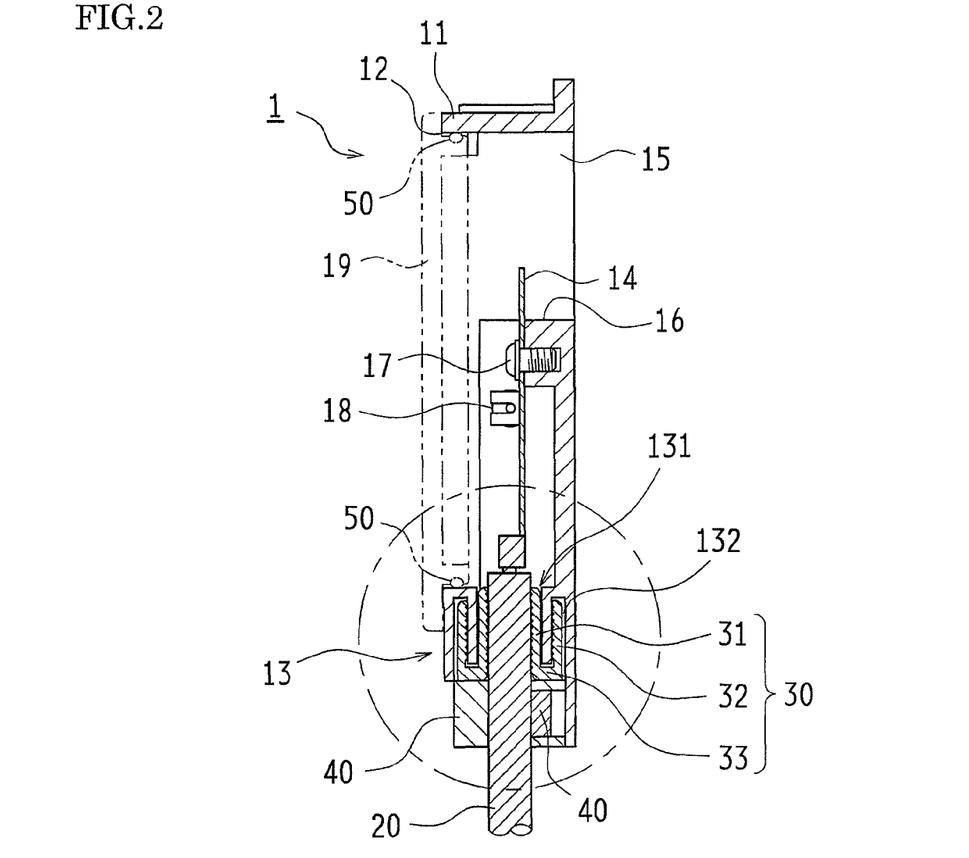
FIG. 2 is a cross-sectional view taken along the line A-A shown in FIG. 1.
Figure 3:
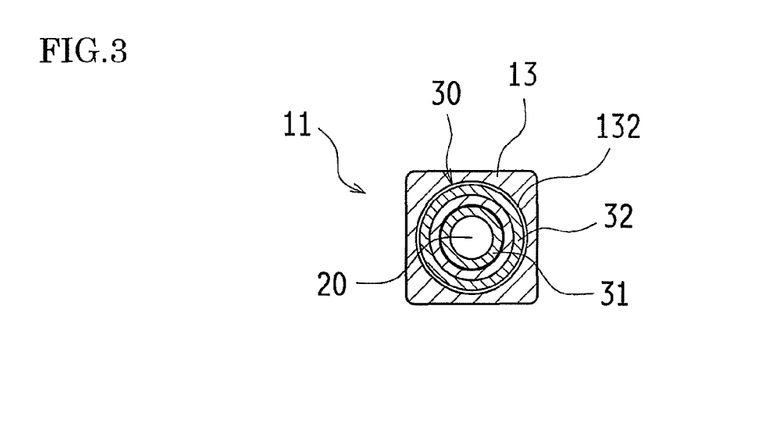
FIG. 3 is a cross-sectional view taken along the line B-B shown in FIG. 1.
Figure 4:
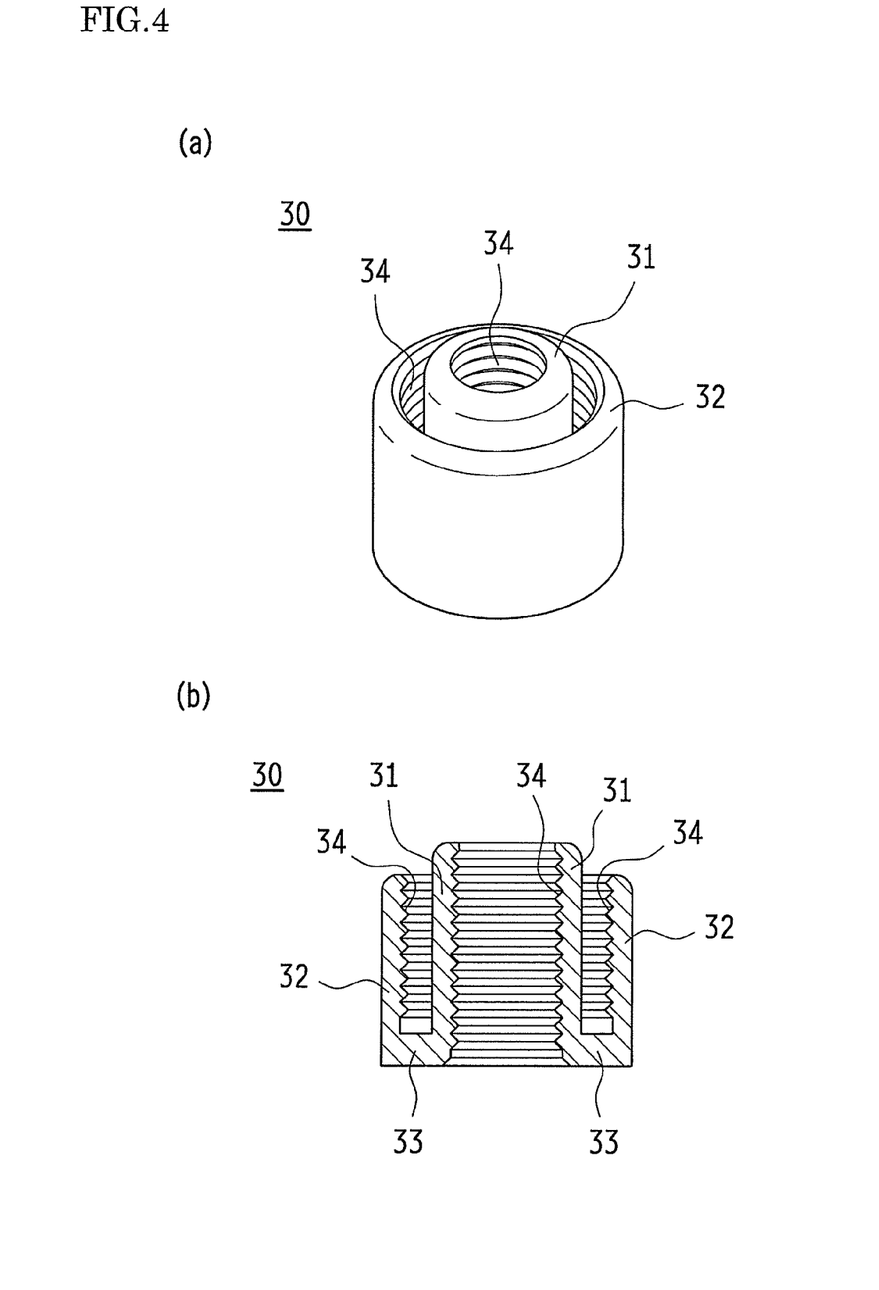
FIG. 4(a) is a perspective view of an exemplary water blocking sleeve.
FIG. 4(b) is a cross-sectional view of the water blocking sleeve shown in FIG. 4(a).
Figure 5:
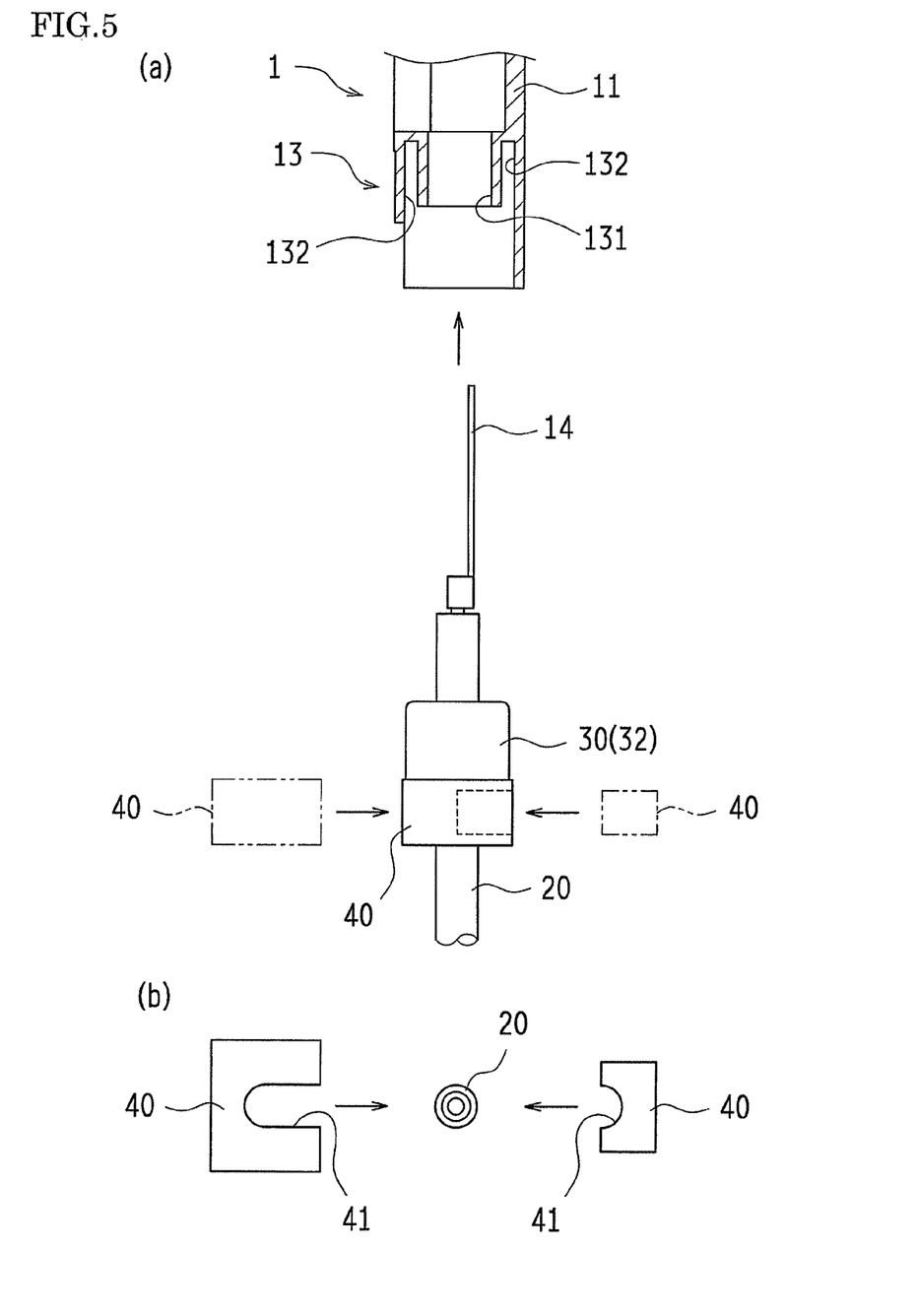
FIG. 5(a) is a diagram illustrating an exemplary process of assembly of the terminal box.
FIG. 5(b) is an axial view of a connection cable shown in FIG. 5(a).

FIGS. 1 to 6 show an example of the terminal box for a solar cell module according to the present invention (hereinafter simply referred to as "terminal box"). FIG. 1 is a plan view of a box body of the terminal box. FIG. 2 is a cross-sectional view taken along the line A-A shown in FIG. 1. FIG. 3 is a cross-sectional view taken along the line B-B shown in FIG. 1. FIG. 4(a) is a perspective view of an exemplary water blocking sleeve. FIG. 4(b) is a cross-sectional view of the water blocking sleeve shown in FIG. 4(a). FIG. 5(a) is a diagram illustrating an exemplary process of assembly of the terminal box, and FIG. 5(b) is an axial view of a connection cable shown in FIG. 5(a).

A terminal box 1 is mounted on the rear surface of a solar cell module. On the front surface of the solar cell module, a plurality of mutually electrically coupled solar cell cells are disposed. For example, solar photovoltaic generation is performed by a plurality of solar cell modules arranged in a matrix on the roof or other location of a building, and the terminal box 1 is used to electrically couple the solar cell module to abutting solar cell modules. Thus, the power generated by the solar cell modules is retrieved.

A box body 11 is made of, for example, synthetic resin or a similar material that has such characteristics as anti-weatherability, electric insulation, impact resistance, heat resistance, and non-combustibility. Examples include modified PPO (polyphenylene oxide) and ABS (acrylonitrile-butadiene-styrene). The box body 11 is in the form of a bottomed case with an opening 12 on the upper surface of the box body 11. The box body 11 includes two cable introduction portions 13 on a side surface of the box body 11 (the downward side surface in FIG. 1) apart from a coupling hole 15.

In the box body 11, four terminal plates 14 are disposed. The four terminal plates 14 are aligned at predetermined intervals. Each of the terminal plates 14 is disposed such that the distal end on one end side faces the coupling hole 15 of the box body 11. To the distal end of the terminal plate 14, an output terminal, not shown, of the solar cell module is coupled.

In the box body 11, a fixed table 16 to which the terminal plates 14 is secured is disposed upright on the bottom surface of the box body 11. The terminal plates 14 are placed on the fixed table 16 of the box body 11 and secured to the box body 11 by securing metal fittings 17.

In the box body 11, the terminal plates 14 positioned at the ends of the box body 11 are coupled to respective connection cables 20. The connection cables 20 are secured to the box body 11. One end of each of the connection cables 20 is introduced into the box body 11 through a cable introduction portion 13 disposed on a side surface of the box body 11.

The cable introduction portion 13 has a cylindrical shape defining space therein that passes inside and outside the box body 11. To describe this in more detail by referring to FIGS. 1 and 2, the cable introduction portion 13 of the exemplary box body 11 includes an approximately cylindrical wiring hole 131 through which the connection cable 20 passes, and an outer circumference groove 132 disposed on the outer circumference of the wiring hole 131 and being open in the outer direction on the side surface of the box body 11.

A water blocking sleeve 30 is disposed around the connection cable 20 to fix it while preventing entrance of water between the box body 11 and the connection cable 20, especially between the cable introduction portion 13 and the connection cable 20. In the case of FIG. 2, the water blocking sleeve 30 is disposed around the connection cable 20 on its outer circumference at the portion where the connection cable 20 is introduced into the box body 11. More specifically, the water blocking sleeve 30 is disposed at the portion, and its vicinity, where the connection cable 20 introduced by the cable introduction portion 13 corresponds to the wiring hole 131.

The water blocking sleeve 30 includes an approximately cylindrical inner sleeve 31 and an outer sleeve 32 on the outer side of the inner sleeve 31. The inner sleeve 31 and the outer sleeve 32 each have one end coupled to a ring-shaped base 33 to form an integral shape. The inner sleeve 31 of the water blocking sleeve 30 is in close contact with the outer circumference surface of the connection cable 20, while the outer sleeve 32 of the water blocking sleeve 30 is in close contact with the cable introduction portion 13. The base 33 of the water blocking sleeve 30 shuts off the cable introduction portion 13 between the inside and outside of the box body 11.

It is particularly noted that the exemplary water blocking sleeve 30 is made of a rubber material. The inner diameter of the inner sleeve 31 is equal to or less than the outer diameter of the connection cable 20. This ensures that the inner sleeve 31 of the water blocking sleeve 30 comes into close contact with the outer circumference surface of the connection cable 20. Additionally, the inner diameter or outer diameter of the outer sleeve 32 of the water blocking sleeve 30 is equal to or less than the diameter of the cable introduction portion 13. This ensures that the outer sleeve 32 of the water blocking sleeve 30 comes into close contact with the cable introduction portion 13.

Additionally, the water blocking sleeve 30 includes a plurality of elastic depressions and protrusions 34 at the interface between the connection cable 20 and the water blocking sleeve 30 and at the interface between the cable introduction portion 13 and the water blocking sleeve 30. The depressions and protrusions 34 may be elastically in close contact with the connection cable 20 and the cable introduction portion 13.

In this case, as shown in FIG. 4(a) and FIG. 4(b), the depressions and protrusions 34 of the water blocking sleeve 30 form a plurality of grooves continuous in the circumferential direction on the inner circumference surfaces of the inner sleeve 31 and the outer sleeve 32. Since the water blocking sleeve 30 is made of a rubber material, the depressions and protrusions 34 have elasticity and thus are elastically in close contact with the connection cable 20 at the interface between the connection cable 20 and the water blocking sleeve 30 and with the cable introduction portion 13 at the interface between the cable introduction portion 13 and the water blocking sleeve 30. Thus, these interfaces are watertightly sealed to provide a structure with enhanced cutoff performance. As shown in the drawings, while the depressions and protrusions 34 are disposed on the inner circumference surfaces of the water blocking sleeve 30, the outer circumference surface of the water blocking sleeve 30 may form a smooth cylindrical outer circumference surface. The inner sleeve 31 may be longer than the outer sleeve 32 in the axial direction and have an upper portion protruding beyond the outer sleeve 32 as shown in FIG. 4(b).

The water blocking sleeve 30 thus configured is prepared in advance around the connection cable 20 to be introduced into the box body 11. Specifically, as shown in FIG. 5(a), the water blocking sleeve 30 is fitted around the outer circumference of the connection cable 20. The connection cable 20 around which the water blocking sleeve 30 is disposed is inserted into the cable introduction portion 13 of the box body 11 with the water blocking sleeve 30 having the inner sleeve 31 disposed through the wiring hole 131 and having the outer sleeve 32 fitted in the outer circumference groove 132.

As shown in FIG. 5(a) and FIG. 5(b), the connection cable 20 is attached with securing members 40 abutting on the water blocking sleeve 30 at its lower side as shown in FIG. 5(a). The securing members 40 stably secure the connection cable 20 to the box body 11. The securing members 40 are made of a similar material to the material of the box body 11, and the securing members 40 are secured to the box body 11 by ultrasonic welding or other processing. Thus, the connection cables 20 are integrally secured to the box body 11.

In the exemplary embodiment, the securing members 40 are a pair of plastic members with grooves 41 that together surround the connection cable 20. One of the securing members 40 covers the outer circumference of the connection cable 20, while the other securing member 40 is fitted in the one securing member 40.

Figure 6:
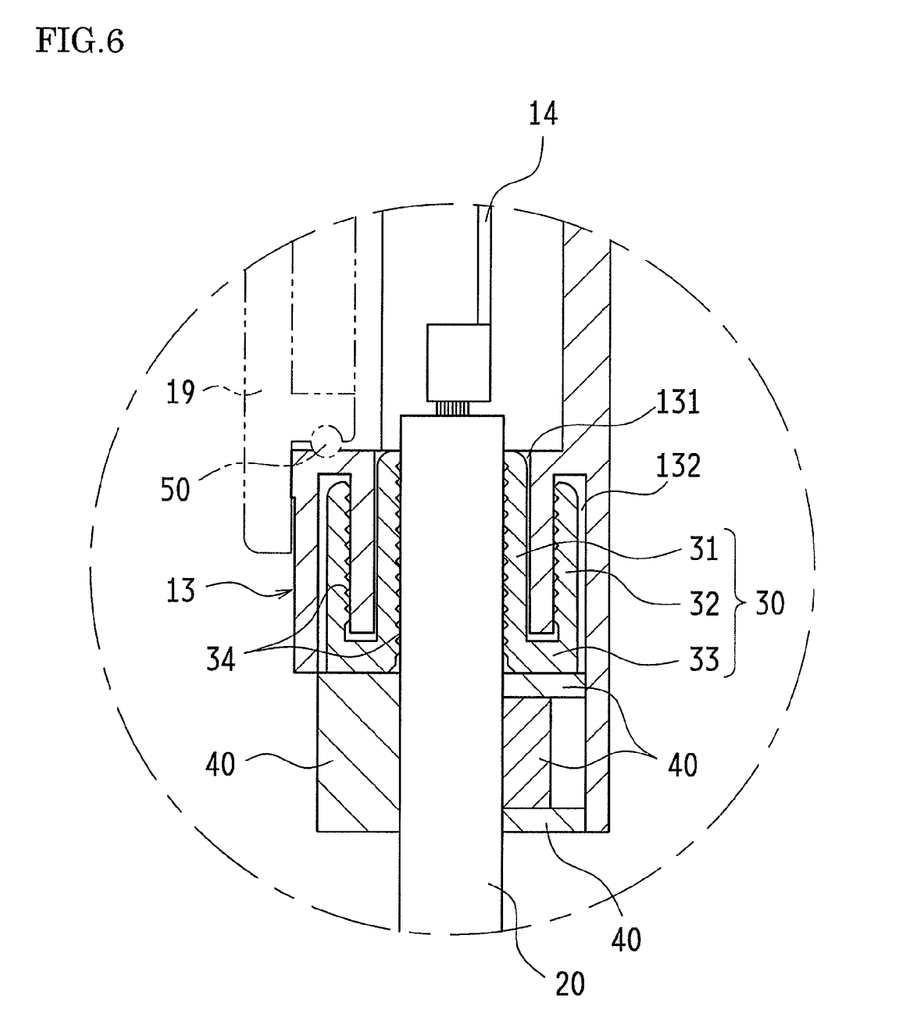
FIG. 6 is a partially enlarged cross-sectional view of the terminal box shown in FIG. 1.

FIG. 6 is a partially enlarged cross-sectional view of the terminal box. In FIG. 6, for clear identification of the elements, the connection cable 20, a lid 19, and other elements are not hatched even though they are shown in cross-section.

With the water blocking sleeve 30 of the above-described structure in place, the cable introduction portion 13 of the box body 11 through which the connection cable 20 is introduced has the structure shown in an enlarged manner in FIG. 6. The water blocking sleeve 30 is watertightly secured to the connection cable 20 and the cable introduction portion 13. This prevents occurrence of a gap that could cause water to enter the box body 11 at the interface between the water blocking sleeve 30 and the connection cable 20 and at the interface between the water blocking sleeve 30 and the cable introduction portion 13, ensuring the waterproof property of the terminal box 1. The depressions and protrusions 34 of the water blocking sleeve 30 allow for contraction of the connection cable 20 due to changes in temperature, thereby preventing occurrence of a gap.

When the box body 11 is in use, the lid 19 is mounted on the opening 12 and the box body 11 is thus sealed. At the portion where the lid 19 and the box body 11 are fitted with one another, a seal member 50 such as an O-ring and a rubber material is provided on the lid 19 side. This ensures watertight sealing between the lid 19 and the box body 11 and ensures the waterproof property of the terminal box 1 without potting using silicone resin or other material.

Conventionally, expensive silicone resin was necessary to ensure the waterproof property of the terminal box 1. This embodiment, however, eliminates the need for silicone resin and reduces the material cost and the production cost of the terminal box 1. This also saves the time for waiting for the silicone resin to cure and shortens the time necessary for production of the terminal box 1. Also conventionally, potting using silicone resin involved problems including entrance of air bubbles and non-uniform potting, and thus it was difficult to ensure a waterproof property. The exemplary embodiment, however, ensures a stable waterproof property.

As described above, the connection cables 20 secured to the box body 11 are coupled to a connector for external coupling, not shown, and through the connector for external coupling, can be coupled to connection cables or other elements of other terminal boxes disposed on other solar cell modules.

As shown in FIG. 1, in the box body 11, a bypass diode 18 is disposed between abutting terminal plates 14. In this example, three bypass diodes 18 are used for the single terminal box 1. Each of the bypass diodes 18 has its lead wire portions coupled to portions of the terminal plates 14 near the base end to prevent inverse direction current from flowing to the solar cell module.

The water blocking sleeve 30 will not be limited to the exemplary embodiment. Any other configuration is possible insofar as it is disposed around the connection cable 20 and kept in place in close contact, watertightly, with the cable introduction portion 13. Accordingly, providing the depressions and protrusions 34 on the inner sleeve 31 and the outer sleeve 32 is not intended in a limiting sense. These sleeves may be straight sleeves. Additionally, the above-described inner structure of the box body 11 has been provided for exemplary purposes only and will not be limited to the above-described configuration.

As has been described hereinbefore, in the terminal box 1 according to the present invention, the water blocking sleeve 30 is disposed around the connection cable 20 to prevent entrance of water between the box body 11 and the water blocking sleeve 30, especially between the cable introduction portion 13 and the water blocking sleeve 30. This ensures cutoff performance at the cable introduction portion 13 through which the connection cable 20 is to be introduced. The water blocking sleeve 30 also includes the inner sleeve 31 and the outer sleeve 32, as described above, and thus exhibits long-term highness in waterproof performance with respect to the connection cable 20 and to the cable introduction portion 13. Additionally, the seal member 50 between the box body 11 and the lid 19 ensures cutoff performance of the box body 11. This eliminates the need for potting using silicone resin and ensures reductions in the work time and cost.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

INDUSTRIAL APPLICABILITY

The present invention finds applications in terminal boxes for solar cell modules in solar photovoltaic generation systems.

DESCRIPTION OF THE REFERENCE NUMERAL

1 Terminal box
11 Box body
12 Opening
13 Cable introduction portion
131 Wiring hole
132 Outer circumference groove
14 Terminal plate
16 Fixed table
17 Securing metal fitting
18 Bypass diode
19 Lid
20 Connection cable
30 Water blocking sleeve
31 Inner sleeve
32 Outer sleeve
33 Base
34 Depressions and protrusions
40 Securing member
50 Seal member

The invention claimed is:

1. A terminal box for a solar cell module, the terminal box being disposed on the solar cell module to electrically couple the solar cell module to a plurality of solar cell modules, the terminal box comprising:
   a box body sealed by a lid,
   wherein the box body comprises, inside the box body, a plurality of terminal plates coupled to an output terminal of the solar cell module,
   wherein the box body comprises, on a side surface of the box body, a cable introduction portion through which a connection cable for external coupling is introduced into the box body and wired therein to be coupled to the terminal plates,
   wherein a water blocking sleeve made of a rubber material is disposed around the connection cable to secure the connection cable to the cable introduction portion,
   wherein the water blocking sleeve comprises an inner sleeve in close contact with an outer circumferential surface of the connection cable, an outer sleeve disposed radially outside of the inner sleeve so as to surround the inner sleeve and be in close contact with the cable introduction portion, and a base, the inner sleeve and the outer sleeve each having one end coupled to the base to form an integral shape,
   wherein the inner sleeve comprises depressions and protrusions forming a plurality of grooves continuously in a circumferential direction on an interface between the inner sleeve and the connection cable,
   wherein the outer sleeve comprises depressions and protrusions forming a plurality of grooves continuously in the circumferential direction on an interface between a radially inner surface of the outer sleeve and the cable introduction portion, and
   wherein the water blocking sleeve is disposed between the cable introduction portion and the connection cable to seal the interface between the inner sleeve and the connection cable and the interface between the outer sleeve and the cable introduction portion.

2. The terminal box for a solar cell module according to claim 1, wherein the cable introduction portion of the box body comprises an approximately cylindrical wiring hole through which the connection cable passes, and an outer circumference groove disposed on an outer circumference of the wiring hole and being open to an outer side surface of the box body, and
   wherein the inner sleeve of the water blocking sleeve is disposed through the wiring hole, while the outer sleeve of the water blocking sleeve is fitted in the outer circumference groove.

3. The terminal box for a solar cell module according to claim 1,
   wherein the inner sleeve of the water blocking sleeve comprises an inner diameter of equal to or less than an outer diameter of the connection cable and is in close contact with the outer circumferential surface of the connection cable, and
   wherein the outer sleeve of the water blocking sleeve comprises an inner diameter or outer diameter of equal to or less than a diameter of the cable introduction portion and is in close contact with the cable introduction portion.

4. The terminal box for a solar cell module according to claim 2,
   wherein the inner sleeve of the water blocking sleeve comprises an inner diameter of equal to or less than an outer diameter of the connection cable and is in close contact with the outer circumferential surface of the connection cable, and
   wherein the outer sleeve of the water blocking sleeve comprises an inner diameter or outer diameter of equal to or less than a diameter of the cable introduction portion and is in close contact with the cable introduction portion.

* * * * *